United States Patent
Montanyà i Silvestre

(10) Patent No.: US 12,512,172 B2
(45) Date of Patent: Dec. 30, 2025

(54) ONE-TIME PROGRAMMABLE MEMORY DEVICE

(71) Applicant: Nanusens SL, Cerdanyola del Vallès (ES)

(72) Inventor: Josep Montanyà i Silvestre, Cerdanyola del Vallès (ES)

(73) Assignee: Nanusens SL, Cerdanyola del Vallés (ES)

( * ) Notice: Subject to any disclaimer, the term of this patent is extended or adjusted under 35 U.S.C. 154(b) by 133 days.

(21) Appl. No.: 18/211,718

(22) Filed: Jun. 20, 2023

(65) Prior Publication Data
US 2023/0420063 A1   Dec. 28, 2023

Related U.S. Application Data

(60) Provisional application No. 63/354,851, filed on Jun. 23, 2022.

(51) Int. Cl.
*G11C 17/00*   (2006.01)
*G11C 17/16*   (2006.01)
(Continued)

(52) U.S. Cl.
CPC .............. *G11C 17/16* (2013.01); *G11C 17/18* (2013.01); *H01L 23/5226* (2013.01); *H10B 20/25* (2023.02)

(58) Field of Classification Search
CPC ........ G11C 17/16; G11C 17/18; H10B 20/25; H10L 23/5226
(Continued)

(56) References Cited

U.S. PATENT DOCUMENTS

| | | | | | |
|---|---|---|---|---|---|
| 4,128,670 A | * | 12/1978 | Gaensslen | .......... | H10D 30/0223 148/DIG. 147 |
| 6,952,038 B2 | * | 10/2005 | Hsu | ........ | H10D 88/00 438/257 |

(Continued)

FOREIGN PATENT DOCUMENTS

| CN | 101740569 A | * | 6/2010 |
|---|---|---|---|
| TW | 508756 B1 | * | 11/2015 |

OTHER PUBLICATIONS

Chung, S., "I-fuse OTP—The OTP of Choice," [online] URL:https://www.design-reuse.com/articles/35933/i-fuse-otp-the-otp-of-choice.html, Attopsemi Technology, (Nov. 2014), 6 pages.
(Continued)

*Primary Examiner* — Viet Q Nguyen
(74) *Attorney, Agent, or Firm* — Boston & Galway LLC; Christopher Carroll

(57) ABSTRACT

An example one-time programmable (OTP) memory device is provided. The OTP memory device include a passivation layer. A top metal layer is positioned below the passivation layer. The top metal layer includes one or more holes configured to an etching medium to pass through the holes. An array of memory elements is positioned in a memory layer below the top metal layer. A first metal address line layer is positioned below the array of memory elements and includes a plurality of first address lines extending in a first direction. A first end of each memory element being connected to one of the plurality of first metal address lines. A second metal address line layer is positioned below the first metal address line layer and includes a plurality of second metal address lines extending in a second direction. The second direction is different than the first direction.

26 Claims, 3 Drawing Sheets

(51) Int. Cl.
*G11C 17/18* (2006.01)
*H01L 23/522* (2006.01)
*H10B 20/25* (2023.01)

(58) Field of Classification Search
USPC .......................................................... 365/96
See application file for complete search history.

(56) References Cited

U.S. PATENT DOCUMENTS

| | | | | |
|---|---|---|---|---|
| 7,933,133 | B2* | 4/2011 | Shepard | G11C 17/16 |
| | | | | 365/163 |
| 8,946,000 | B2* | 2/2015 | Reber | H01L 23/5329 |
| | | | | 438/190 |
| 11,239,112 | B2* | 2/2022 | Chandhok | H01L 23/53266 |
| 11,501,051 | B2* | 11/2022 | Chang | H10B 12/312 |
| 2006/0234428 | A1* | 10/2006 | Furukawa | H10D 30/0323 |
| | | | | 438/149 |
| 2007/0176219 | A1* | 8/2007 | Osabe | H10B 69/00 |
| | | | | 257/E29.302 |
| 2010/0013045 | A1 | 1/2010 | Weeks | |
| 2011/0045644 | A1 | 2/2011 | Barth et al. | |
| 2012/0188818 | A1 | 7/2012 | Ranjan et al. | |
| 2012/0188819 | A1* | 7/2012 | Montanya Silvestre | |
| | | | | G11C 11/5657 |
| | | | | 365/174 |
| 2014/0225250 | A1 | 8/2014 | Montanya Silvestre et al. | |
| 2022/0208594 | A1* | 6/2022 | Or-Bach | H10B 43/20 |
| 2023/0089590 | A1* | 3/2023 | Chang | G11C 17/16 |
| | | | | 716/119 |
| 2024/0113011 | A1* | 4/2024 | Tu | H01L 21/76877 |

OTHER PUBLICATIONS

International Search Report and Written Opinion in Application No. PCT/EP2023/066853 dated Sep. 8, 2023, 16 pages.

* cited by examiner

_ONE-TIME PROGRAMMABLE MEMORY DEVICE_

RELATED APPLICATIONS

This application claims priority to U.S. provisional application No. 63/354,851 filed on Jun. 23, 2022, the contents of which is included herein in its entirety.

BACKGROUND

There are various types of OTP (one-time programmable) memory devices, including EPROM, e-fuse, anti-fuse, and I-fuse. EPROM works by charge trapping. E-fuse uses a high current to blow a metal wire, while anti-fuse breaks the gate oxide of a transistor. I-fuse is similar to e-fuse, but it uses optimized electronics that require less current until the wire reaches its electromigration limit. The advantage of I-fuse over e-fuse is that it limits the amount of current used and avoids wire breakage, ensuring reliable writing. Additionally, I-fuse, made by Attopsemi™, uses a diode instead of a transistor, which reduces the required area.

SUMMARY

According to one aspect of the subject matter described in this disclosure, an example one-time programmable (OTP) memory device is provided. The OTP memory device include a passivation layer. A top metal layer is positioned below the passivation layer. The top metal layer includes one or more holes configured to pass an etching medium through the holes. An array of memory elements is positioned in a memory layer below the top metal layer. A first metal address line layer is positioned below the array of memory elements and includes a plurality of first address lines extending in a first direction. A first end of each memory element being connected to one of the plurality of first metal address lines. A second metal address line layer is positioned below the first metal address line layer and includes a plurality of second metal address lines extending in a second direction. The second direction is different than the first direction, a second end of each of each memory element being connected to one of the plurality of second address lines. In a first region of the device, the passivation layer, top metal layer, memory layer, first metal address line layer, and second metal address line layer are separated by a first portion of $SiO_2$ material. In a second region of the device, a second portion of the $SiO_2$ material has been removed between the passivation layer, top metal layer, and memory layer.

In some implementations, the etching medium may include vapour HF (vHF). The second portion of the $SiO_2$ material may be removed by the etching medium. Each of the memory elements may be connected to a first address line using at least one via. Each of the memory elements may be connected to a second address line using at least one via. The first metal address line layer and the second metal address line layer may be positioned at least one layer below the memory layer. The first metal address line layer and second metal address line layer may be positioned at least two layers below the memory layer.

According to another aspect of the subject matter described in this disclosure, a method for fabricating a one-time programmable (OTP) memory device is provided. The method includes: providing a passivation layer; forming a top metal layer below the passivation layer, the top metal layer including one or more holes configured to pass an etching medium through the holes; positioning an array of memory elements positioned in a memory layer below the top metal layer; forming a first metal address line layer below the array of memory elements and including a plurality of first address lines extending in a first direction, a first end of each memory element being connected to one of the plurality of first metal address lines; and forming a second metal address line layer positioned below the first metal address line layer and including a plurality of second metal address lines extending in a second direction, the second direction being different than the first direction, a second end of each of each memory element being connected to one of the plurality of second address lines. In a first region of the device, the passivation layer, top metal layer, memory layer, first metal address line layer, and second metal address line layer are separated by a first portion of $SiO_2$ material. In a second region of the device, a second portion of the $SiO_2$ material has been removed between the passivation layer, top metal layer, and memory layer.

In some implementations, the etching medium may include vapour HF (vHF). The method may include removing, by the etching medium, the second portion of the $SiO_2$ material. The method may include connecting each of the memory elements to a first address line using at least one via. The method may include connecting, using at least one via, each of the memory elements is connected to a second address line. The method may include positioning the first metal address line layer and the second metal address line layer at least one layer below the memory layer. The method may include positioning the first metal address line layer and second metal address line layer at least two layers below the memory layer.

According to another aspect of the subject matter described in this disclosure, a method for programming a one-time programmable (OTP) memory is provided. The method includes: configuring an OTP device, the OTP device comprising: a passivation layer; a top metal layer positioned below the passivation layer, the top metal layer including one or more holes configured to allow an etching medium to pass through the holes; an array of memory elements positioned in a memory layer below the top metal layer; a first metal address line layer positioned below the array of memory elements and including a plurality of first address lines extending in a first direction, a first end of each memory element being connected to one of the plurality of first metal address lines; and a second metal address line layer positioned below the first metal address line layer and including a plurality of second metal address lines extending in a second direction, the second direction being different than the first direction, a second end of each of each memory element being connected to one of the plurality of second address lines; wherein, in a first region of the device, the passivation layer, top metal layer, memory layer, first metal address line layer, and second metal address line layer are separated by a first portion of $SiO_2$ material; and wherein, in a second region of the device, a second portion of the $SiO_2$ material has been removed between the passivation layer, top metal layer, and memory layer; and applying an electrical current through the one or more memory elements to break certain connections of the one or more memory elements with the first metal address lines or the second metal address lines to configure a memory element as a logic one or zero respectively.

In some implementations, the etching medium may include vapour HF (vHF). The OTP memory device may include the second portion of the $SiO_2$ material removed by the etching medium. The OTP memory device may include each of the memory elements connected to a first address line using at least one via. The OTP memory device may include each of the memory elements connected to a second address line using at least one via. The OTP memory device may include the first metal address line layer and the second metal address line layer positioned at least one layer below the memory layer. The OTP memory device may include the first metal address line layer and second metal address line layer positioned at least two layers below the memory layer.

According to one aspect of the subject matter described in this disclosure, an example one-time programmable (OTP) memory device is provided. The OTP memory includes a memory element positioned in a memory layer. At least one memory address line is positioned below the memory layer. The memory element is not buried in a $SiO_2$ material while connections to the at least one memory address line are buried in the $SiO_2$ material.

In some implementations, the memory element may be connected to a first address line using at least one via. The memory element may be connected to a second address line using at least one via. The at least one memory address line may be positioned on at least one first metal address line layer positioned at least one layer below the memory layer. The OTP memory device may include a top metal layer positioned below a passivation layer. The top metal layer may include one or more holes configured to pass an etching medium through the holes. The memory element may be positioned in the memory layer below the top metal layer. The etching medium may include vapour HF (vHF).

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Figure 1:
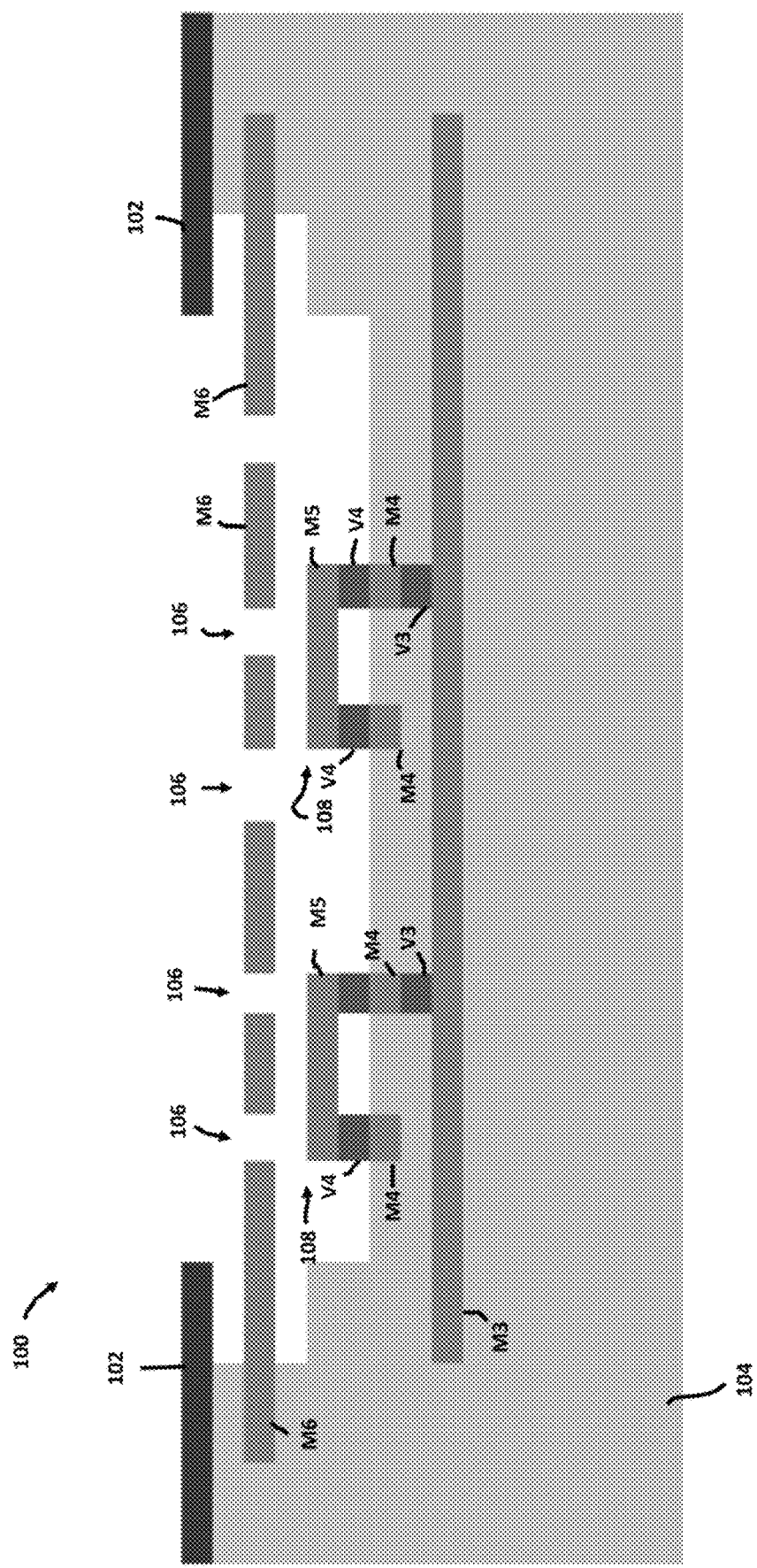
FIG. 1 is a schematic diagram of a cross-sectional view of an example OTP memory device.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

A one-time programmable (OTP) memory device and methods for performing the operations of an OTP memory device are described herein to address problems with existing OTP memories, including modifying the e-fuse and/or I-fuse by eliminating the $SiO_2$ around the metal wire that we want to break. In existing implementations, the metal wire is encased by $SiO_2$, which is an excellent conductor of heat. As a result, the wire is difficult to break because the heat generated by the flow of current through the narrow and thin wire (due to its electrical resistance) is rapidly dissipated by the surrounding $SiO_2$. This makes it challenging to increase the wire's temperature, which is required to blow it or reach the electromigration limit. However, by removing the $SiO_2$, the temperature of the wire can quickly rise with a small amount of current.

Reducing the current required to "write" the memory—either by melting, blowing, or going beyond its electromigration limit—has numerous benefits. Firstly, it simplifies the driving electronics required to integrate with the ASIC and memory area, as a large peak current is not needed. Secondly, by keeping the wires transporting the current to the memory elements buried into $SiO_2$, a dedicated element to generate a large amount of current may not be required, allowing for narrower connecting wires and achieving a high area density. Thirdly, several metal layers are needed to implement the memory, and a simple driving circuit located on one side is required, instead of a local driver for each memory element. The front end (and remaining metal layers) located below the memory area (except for the driving circuit) may be used to implement the ASIC. Essentially, the OTP memory device comes almost for free, without any dedicated area (except for the small driving circuit). A preferred embodiment uses only 4 metal layers, which will be explained later.

In order to create the OTP memory device, it might be required to use a vHF (vapor HF) to release the metal wires utilized for programming the OTP memory from the wafer/ chip. Although alternative methods and technologies are available to release the $SiO_2$ around the metal wires, vHF is the preferred option.

This concept is applicable to CMOS, in all its nodes. It is applicable to any other semiconductor process.

FIG. 1 is a schematic diagram of an example OTP memory device 100. OTP memory device 100 is composed of the top four metal layers (M6-M3) in a 6 metal layer 180 nm CMOS process. This leaves the option to utilize the metal layers M1 and M2 and the front end below the OTP memory device 100 for implementing other parts of the ASIC. Additionally, a conventional driving circuit can be placed beside or beneath the OTP memory device 100, using similar techniques to those used in other e-fuse and/or I-fuse-based technologies. It's worth noting that each memory element doesn't need its own active element made with transistors or diodes.

Metal layers M3 and M4 include an array of metal tracks with an equal and minimal width to withstand the current needed to blow the memory element above them. So metal layer M3 may have an array of parallel metal tracks, and M4 may have the same array of parallel metal tracks but rotated 90°.

The top layer of metal M6 is continuous with a series of holes 106. Holes 106 are preferred to have a width of 0.8 µm, but this can vary depending on the specific process or node being used. The aim is to ensure that the holes 106 are small enough to be sealed quickly using standard Wafer Level Chip Scale Package (WLCSP) processes but not so small that they cannot be opened during CMOS processing. For a 180 nm CMOS process, a size of 0.8 µm is generally suitable for most foundries. The spacing of the holes is linked to the vHF etching recipe that is applied later. Increasing the space between etching holes 106 requires a more aggressive etching recipe. Reducing the spacing can simplify the vHF etching process by making it faster without needing an aggressive recipe. A spacing of 3 µm is found to be effective. Usually it may be between 2 µm and 6 µm.

The memory elements 108 are implemented on metal layer M5. Metal layer M5 can have a simple straight shape, but metal layer M5 may have a longer and more sophisticated shape. In principle, the preferred shape is linear, as current is intended to pass through metal layer M5 and raise its temperature. In some implementations, a shape having a narrow section along all its length may be preferred. In other implementations, to maximize the length in a minimal area, one can use a spiral shape for instance. The ends of metal layer M5 are connected to metal layer M4 by vias V4.

The memory element 108 can either be a single bit with electrical conductivity of either zero or close to infinity. Alternatively, it may be a multi-bit element where its resistance between pre-established levels can be modified by controlling its current and heating.

To support the top metal layer M6 in packaging, particularly molded packages or Wafer Level Chip Scale Package (WLCSP), columns can be added using a metal stack-up and via layers. These columns should have minimal size, starting from M6 and a via between metal layers M5 and M6 and going down to at least metal layer M4. For added reliability, it's possible to go down to metal layer M3 if the vHF decreases unexpectedly.

To achieve the desired outcome, the vHF recipe needs to be properly adjusted for the current design. It should only etch the $SiO_2$ layers above and below metal layer M5 while leaving the $SiO_2$ layer 104 at metal layer M4 and below untouched. Ideally, the vHF etching should only affect the $SiO_2$ layer 104 between metal layers M4 and M5, ensuring that M4 is fully embedded in $SiO_2$, while M5 is completely released.

To avoid yield problems caused by process variations, a more robust design should be implemented for the vHF etching step. The current design is vulnerable to changes in both the CMOS process and vHF etching. If the memory is underetched, metal layer M5 may not be completely released, making it impossible to write to memory. In this case, the $SiO_2$ layer 104 may not dissipate heat when current is applied to program the memory elements, and more current may be needed for writing. Conversely, overetching the memory could result in the release of part or all of the M4 and M3 metal layers, causing them to blow, destroy, or break when programming the memory elements. Additionally, if metal layer M4 is wholly released (or a large enough part of it), and especially if the etching goes down to metal layer M3, metal tracks connecting the memory elements may move and short between them.

One solution to make the system more robust is to use additional metal layers and capacitive anchors or feed-throughs. This makes it harder for vHF to access lower-level metal layers below M3 and M4. However, this approach requires a dedicated memory area, unless one uses a process with more metal layers, as no metal lines are available for electrical connections. The front-end area may only be useful for large transistors or devices or if connections can be made with polysilicon.

Without needing to use capacitive anchors or feed-throughs, an intermediate solution would be simply to move metal layers M3 and M4 towards the bottom by 1 or 2 metal levels. Then the connection to the memory elements 108 would need 2 or 3 vias plus additional metal elements in between, instead of using just one via.

The passivation layer 102 in this design has an open area that reveals a part of the top metal layer M6. The open area contains an array of holes 106 that enable the vHF to penetrate. Beneath metal layer M6 are memory elements 108, which are comprised of metal fuses. Memory elements 108 can come in various shapes, such as linear, spiral, or any other shape used in e-fuse and i-fuse memories. Ensuring no oxide is left around the memory elements 108 after the vHF process is essential.

Memory elements 108, located in metal layers M4 and M3, connect to metal track arrays via Vias V3 and V4. Each metal layer M4 and M3 has parallel tracks oriented orthogonally. The tracks of metal layers M4 and M3 form memory address lines used by each memory element 108. Vias V4 connects one end of memory elements 108 to a metal track at metal layer M4, while Vias V3 connects the other end to a different metal track in metal layer M3. By selecting a metal track at each level, a specific memory element can be chosen.

In some implementations, each memory element 108 may be connected to one of the tracks of metal layers M4 or M3 for purposes of providing a memory address line.

An electrical current may be applied through the memory elements 108 to break certain connections of the memory elements 108 with the first metal address lines (defined by the metal tracks of M4) or the second metal address lines (defined by the metal tracks of M3) to configure a memory element as a logic one or zero respectively. This can be done in production (at the end of it, during calibration of the device that has the memory, etc.), but it can also be left unprogrammed, and the user or the application may determine when this is programmed.

Figure 2:
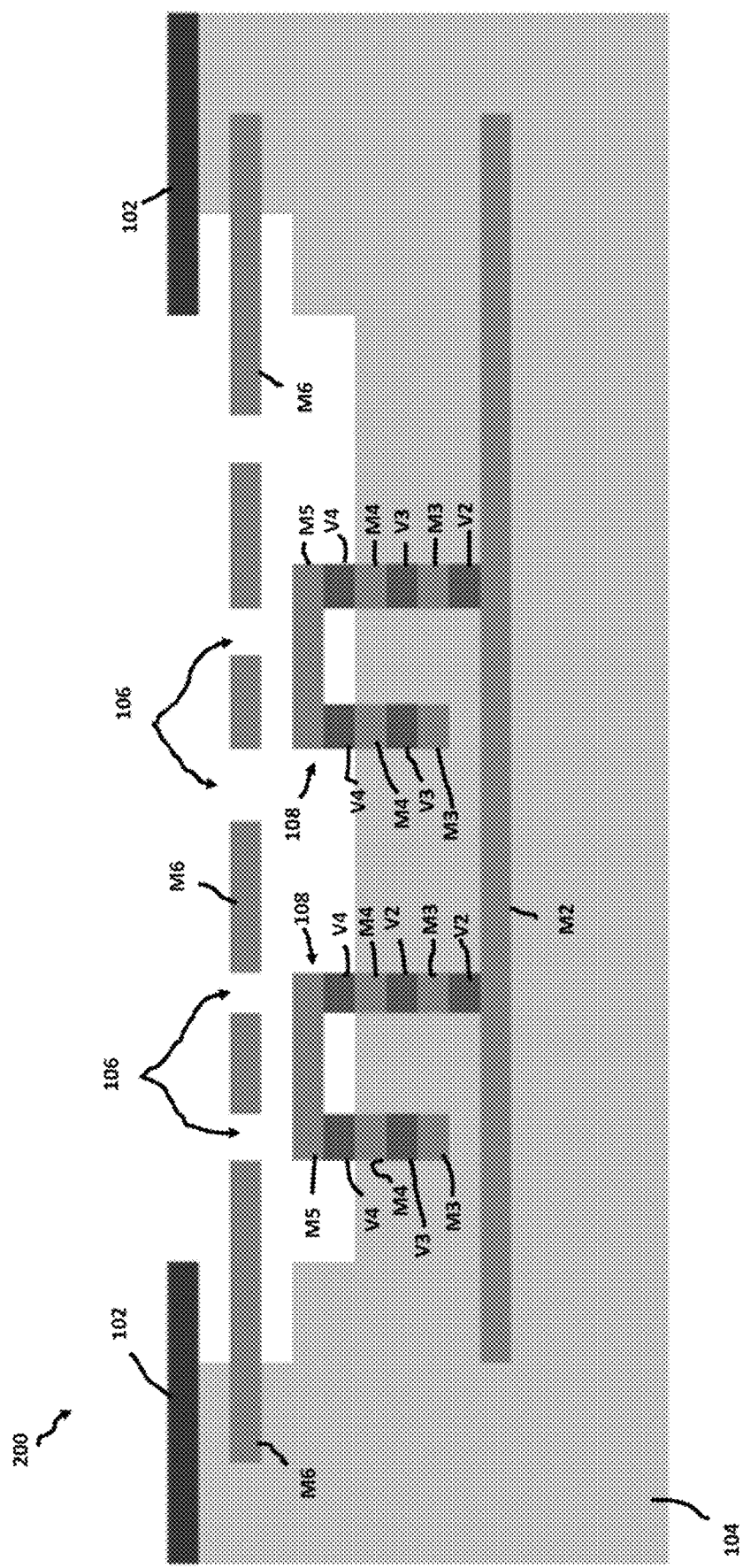
FIG. 2 is a schematic diagram of a cross-sectional view of another example OTP memory device.

FIG. 2 is a schematic diagram of another example OTP memory device 200. OTP memory device 200 is substantially similar to OTP memory 100. In this implementation, the two orthogonal metal tracks are placed at metal layers M3 and M2, and additional tracks are presented at metal layers M4. The additional metal tracks at metal layer M4 are used to connect the memory elements to M3 and M2. Vias V4 connects one end of memory elements 108 to a metal track at metal layer M4, while Vias V2 connects the other end to a different metal track at metal layer M3. Also, Vias V2 connects one of the metal tracks of metal layer M3 to the metal track of metal layer M2 to establish the connection to the other end of memory elements 108. Vias V3 connects the metal tracks of metal layer M4 to the metal tracks of metal layer M3. This allows for more robustness before the vHF etching but requires more metal layers to implement the memory.

Figure 3:
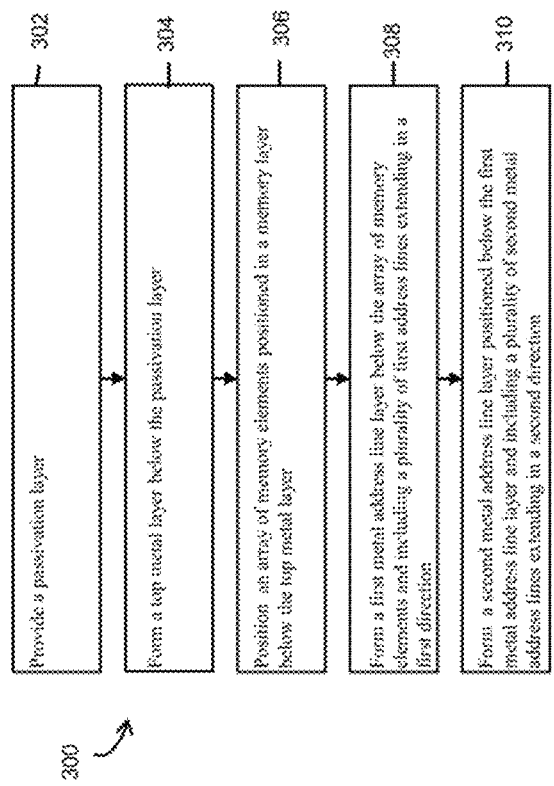
FIG. 3 is a process flowgraph of operations included in an example process for fabricating a one-time programmable (OTP) memory.

FIG. 3 is a process flowgraph of operations included in an example process 300 for fabricating a one-time programmable (OTP) memory. Process 300 includes providing a passivation layer (such as passivation layer 102) (Step 302). A top metal layer (such as metal layer M6) is formed below the passivation layer (Step 304). The top metal layer including one or more holes (such as holes 106) configured to pass an etching medium (such as vHF etching) through the holes.

Process 300 includes positioning an array of memory elements (such as memory elements 108) positioned in a memory layer (such as metal layer M5) below the top metal layer (Step 306). Also, processing 300 includes forming a first metal address line layer (such as metal layer M4 of FIG. 1 or metal layer M4 or M3 of FIG. 2) below the array of memory elements and including a plurality of first address lines (such as metal tracks at metal layer M4 in FIG. 1 or metal tracks at metal layer M3 of FIG. 2) extending in a first direction (Step 308). A first end of each memory element being connected to one of the plurality of first metal address lines.

Process 300 includes forming a second metal address line layer (such as metal layer M3 of FIG. 1 or metal layer M2 of FIG. 2) positioned below the first metal address line layer and including a plurality of second metal address lines (such as metal tracks at metal layer M3 of FIG. 1 or metal tracks at metal layer M2 of FIG. 2) extending in a second direction (Step 310). The second direction is different than the first direction. A second end of each of each memory element is connected to one of the plurality of second address lines. In a first region of the device, the passivation layer, top metal layer, memory layer, first metal address line layer, and second metal address line layer are separated by a first portion of $SiO_2$ material (such as $SiO_2$ layer 104). In a second region of the device, a second portion of the $SiO_2$ material has been removed between the passivation layer, top metal layer, and memory layer.

In some implementations, the etching medium may include vapour HF (vHF). The second portion of the $SiO_2$ material may be removed by the etching medium. Each of the memory elements may be connected to a first address line using at least one via. Each of the memory elements may be connected to a second address line using at least one via. The first metal address line layer and the second metal address line layer may be positioned at least one layer below the memory layer. The first metal address line layer and second metal address line layer may be positioned at least two layers below the memory layer.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A one-time programmable (OTP) memory device comprising:
   a passivation layer;
   a top metal layer positioned below the passivation layer, the top metal layer including one or more holes configured to pass an etching medium through the holes;
   an array of memory elements positioned in a memory layer below the top metal layer;
   a first metal address line layer positioned below the array of memory elements and including a plurality of first metal address lines extending in a first direction, a first end of each memory element being connected to one of the plurality of first metal address lines; and
   a second metal address line layer positioned below the first metal address line layer and including a plurality of second metal address lines extending in a second direction, the second direction being different than the first direction, a second end of each of each memory element being connected to one of the plurality of second metal address lines;
   wherein, in a first region of the device, the passivation layer, top metal layer, memory layer, first metal address line layer, and second metal address line layer are separated by a first portion of $SiO_2$ material; and
   wherein, in a second region of the device, a second portion of the $SiO_2$ material has been removed between the passivation layer, top metal layer, and memory layer.

2. The device of claim 1, wherein the etching medium includes vapour HF (vHF).

3. The device of claim 1, wherein the second portion of the SiO2 material was removed by the etching medium.

4. The device of claim 1, wherein each of the memory elements is connected to a first metal address line using at least one via.

5. The device of claim 4, wherein each of the memory elements is connected to a second metal address line using at least one via.

6. The device of claim 1, wherein the first metal address line layer and the second metal address line layer are positioned at least one layer below the memory layer.

7. The device of claim 6, wherein the first metal address line layer and second metal address line layer are positioned at least two layers below the memory layer.

8. A method for fabricating a one-time programmable (OTP) memory device comprising:
 providing a passivation layer;
 forming a top metal layer below the passivation layer, the top metal layer including one or more holes configured to pass an etching medium through the holes;
 positioning an array of memory elements positioned in a memory layer below the top metal layer;
 forming a first metal address line layer below the array of memory elements and including a plurality of first metal address lines extending in a first direction, a first end of each memory element being connected to one of the plurality of first metal address lines; and
 forming a second metal address line layer positioned below the first metal address line layer and including a plurality of second metal address lines extending in a second direction, the second direction being different than the first direction, a second end of each of each memory element being connected to one of the plurality of second metal address lines;
 wherein, in a first region of the device, the passivation layer, top metal layer, memory layer, first metal address line layer, and second metal address line layer are separated by a first portion of $SiO_2$ material; and
 wherein, in a second region of the device, a second portion of the $SiO_2$ material has been removed between the passivation layer, top metal layer, and memory layer.

9. The method of claim 8, wherein the etching medium includes vapour HF (vHF).

10. The method of claim 8, further comprising removing, by the etching medium, the second portion of the $SiO_2$ material.

11. The method of claim 8, further comprising connecting each of the memory elements to a first metal address line using at least one via.

12. The method of claim 11, further comprising connecting, using at least one via, each of the memory elements is connected to a second metal address line.

13. The method of claim 8, further comprising positioning the first metal address line layer and the second metal address line layer at least one layer below the memory layer.

14. The method of claim 13, further comprising positioning the first metal address line layer and second metal address line layer at least two layers below the memory layer.

15. A method for programming a one-time programmable (OTP) memory comprising:
 configuring an OTP device, the OTP device comprising:
  a passivation layer;
  a top metal layer positioned below the passivation layer, the top metal layer including one or more holes configured to pass an etching medium through the holes;
  an array of memory elements positioned in a memory layer below the top metal layer;
  a first metal address line layer positioned below the array of memory elements and including a plurality of first metal address lines extending in a first direction, a first end of each memory element being connected to one of the plurality of first metal address lines; and
  a second metal address line layer positioned below the first metal address line layer and including a plurality of second metal address lines extending in a second direction, the second direction being different than the first direction, a second end of each of each memory element being connected to one of the plurality of second metal address lines;
  wherein, in a first region of the device, the passivation layer, top metal layer, memory layer, first metal address line layer, and second metal address line layer are separated by a first portion of $SiO_2$ material; and
  wherein, in a second region of the device, a second portion of the $SiO_2$ material has been removed between the passivation layer, top metal layer, and memory; and
 applying an electrical current through the one or more memory elements to break certain connections of the one or more memory elements with the first metal address lines or the second metal address lines to configure a memory element as a logic one or zero respectively.

16. The method of claim 15, wherein the etching medium includes vapour HF (vHF).

17. The method of claim 15, wherein the OTP memory device comprises the second portion of the $SiO_2$ material being removed by the etching medium.

18. The method of claim 15, wherein the OTP memory device comprises each of the memory elements connected to a first metal address line using at least one via.

19. The method of claim 18, wherein the OTP memory device comprises each of the memory elements connected to a second metal address line using at least one via.

20. The method of claim 15, wherein the OTP memory device comprises the first metal address line layer and the second metal address line layer positioned at least one layer below the memory layer.

21. The method of claim 20, wherein the OTP memory device comprises the first metal address line layer and second metal address line layer positioned at least two layers below the memory layer.

22. A one-time programmable (OTP) memory device comprising:
 a memory element positioned in a memory layer;
 at least one memory address line positioned below the memory layer; and
 a top metal layer positioned below a passivation layer, the top metal layer including one or more holes configured to pass an etching medium through the holes;
 wherein, the memory element is not buried in a $SiO_2$ material while connections to the at least one memory address line are buried in the $SiO_2$ material; and
 wherein the etching medium includes vapour HF (vHF).

23. The OTP memory device of claim 22, wherein the memory element is connected to a first address line using at least one via.

24. The OTP memory device of claim 23, wherein the memory element is connected to a second address line using at least one via.

25. The OTP memory device of claim 22, wherein the at least one memory address line is positioned on at least one first metal address line layer positioned at least one layer below the memory layer.

26. The OTP memory device of claim 22, wherein the memory element is positioned in the memory layer below the top metal layer.

* * * * *